United States Patent [19]

Rausing et al.

[11] Patent Number: 4,560,570
[45] Date of Patent: Dec. 24, 1985

[54] METHOD FOR THE PREPARATION OF A POROUS, SOLID OR SEMISOLID FOOD PRODUCT BASED ON GROUND FISH OR MEAT RAW MATERIALS

[75] Inventors: Hans Rausing, Wadhurst Park, England; Marita Rausér, Lund, Sweden

[73] Assignee: Tetra Pak Development SA, Pully, Switzerland

[21] Appl. No.: 613,022

[22] Filed: May 22, 1984

[30] Foreign Application Priority Data

Jun. 1, 1983 [SE] Sweden .................................. 8303100

[51] Int. Cl.$^4$ ................................................ A23L 1/31
[52] U.S. Cl. ...................................... 426/564; 426/574; 426/575; 426/643; 426/646
[58] Field of Search ............... 426/281, 312, 316, 561, 426/574, 575, 643, 646, 652, 519, 399, 564, 474; 261/76, DIG. 7

[56] References Cited

U.S. PATENT DOCUMENTS

| | | | |
|---|---|---|---|
| 2,441,729 | 5/1948 | Steiner | 426/575 X |
| 2,949,366 | 8/1960 | Hunter et al. | 426/575 X |
| 3,114,639 | 12/1963 | Rivoche | 426/564 |
| 3,365,305 | 1/1968 | Hunter | 426/564 |
| 3,891,776 | 6/1975 | Carpenter et al. | 426/574 X |
| 3,953,002 | 4/1976 | England et al. | 261/76 X |
| 4,004,040 | 1/1977 | Puta | 426/564 |
| 4,105,725 | 8/1978 | Ross | 261/DIG. 7 |
| 4,173,657 | 11/1979 | Gaudio et al. | 426/643 X |
| 4,233,320 | 11/1980 | Monaco et al. | 426/574 X |
| 4,272,558 | 6/1981 | Bouette | 426/474 X |
| 4,375,481 | 3/1983 | Kuwabara et al. | 426/575 X |
| 4,418,089 | 11/1983 | Bouette | 426/316 X |
| 4,427,704 | 1/1984 | Cheney et al. | 426/574 X |

*Primary Examiner*—Arthur L. Corbin
*Attorney, Agent, or Firm*—Burns, Doane, Swecker & Mathis

[57] ABSTRACT

A porous food product is prepared by mixing sodium alginate and a calcium compound with ground fish or meat, heating the mixture, introducing a pressurized gas and an acid into the mixture, the acid liberating calcium ions from the calcium compound to cause the sodium alginate to form a gel which confers a porous structure on the product, and reducing the pressure to liberate gas and form gas bubbles in the product.

8 Claims, 2 Drawing Figures

METHOD FOR THE PREPARATION OF A POROUS, SOLID OR SEMISOLID FOOD PRODUCT BASED ON GROUND FISH OR MEAT RAW MATERIALS

BACKGROUND OF THE INVENTION

The present invention relates to a method for the preparation of a porous, solid or semisolid food product based on ground fish or meat raw materials and relates in particular to a method for sterilizing the product through heat treatment and packaging the same under aseptic conditions in sterile packages to that a very long life can be imparted to the product as long as it is kept in its unopened aseptic package.

It is known, e.g. from Swedish Pat. No. 7800776-2 that a pasty food product can be prepared by finely distributing meat or fish products and subsequently heating the said products to sterilization temperature, when the product owing to coagulation obtains a more solid structure. After renewed grinding in aseptic mills, the product becomes semifluid or fluid again, whereupon it is packed under aseptic conditions in sterile packages wherein the product is made permanently to solidify, possibly with the help of added coagulating agents, e.g. alginate. By means of this known method a pastelike product based on meat or fish raw materials can be obtained. This product, which is very righ in protein, can be flavored by means fo the desired flavorings. The product, which is normally very sensitive to heat, can be stored in its package over several months without being kept in refrigerators or freezers, because the product is sterile, the packaging is carried out under aseptic conditions and the packaging container is closed so that bacteria have no access to the contents.

The solidified product is thermostable, which means that after the package has been opened the product can be heat treated, e.g. roasted, without the product melting in the heat.

SUMMARY OF THE INVENTION

It has been found, however, that products of this type obtain a homogeneous structure and so-called short consistency, that is to say they offer little chewing resistance, which has proved to be less pleasant in foodstuffs of this kind. An appreciable enhancement of the "taste sensation" of the product can be achieved if the product can be given porous structure, that is to say a structure containing bubbles. The problem thus consists in modifying the structure of the product known up to now, and the present invention relates to a method for solving this problem.

After the grinding and preparation of the product mixture, which can include the addition of flavoring and coagulating agents and heat treatment, but before the product has been made to solidify in its package, gas bubbles are introduced to form the desired porous structure of the product. The gas bubbles are introduced by dissolving gas under pressure in the product mixture and/or in any of the additives to the product mixture, then reducing or equalizing said pressure in connection with, or before, the introduction of the product into its package so that the dissolved gas is liberated in the form of small gas bubbles which distribute themselves in the fluid product mixture so as to form a permanent porous structure after the product mixture has been made to solidify.

BRIEF DESCRIPTION OF THE DRAWINGS

A preferred embodiment of the invention will be described in the following with reference to the enclosed drawing, wherein.

DETAILED DESCRIPTION OF THE PREFERRED EMBODIMENT

Figure 1:
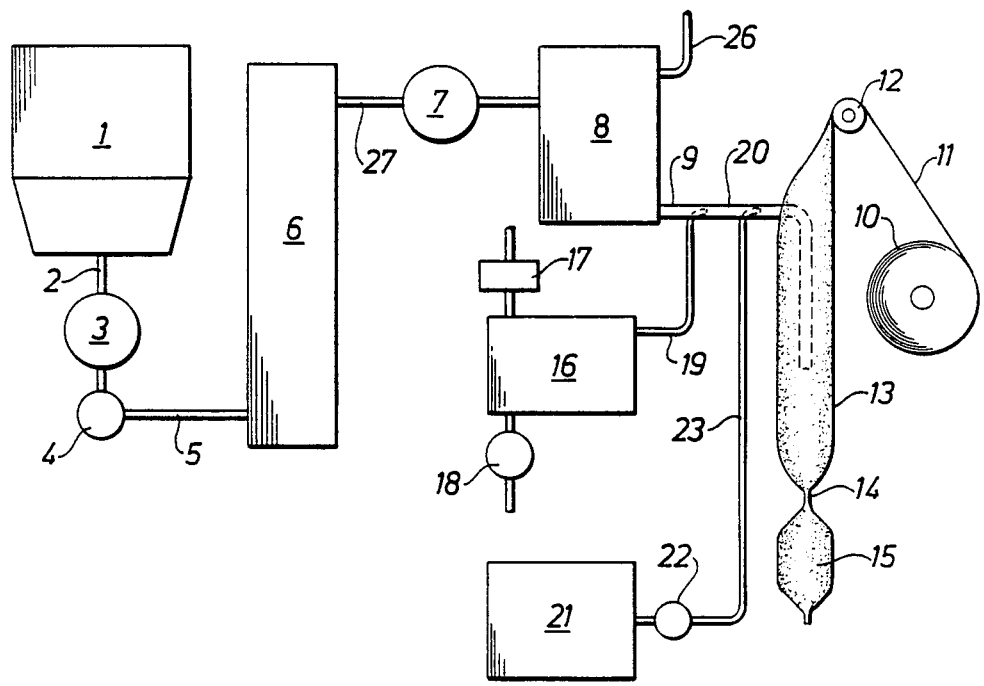
FIG. 1 is a schematic diagram of a plant for the preparation of porous food product and FIG. 2 is a cross-sectional view of a part of the filling pipe 9 of FIG. 1.

In the preparation of the food product in accordance with the invention in the first place the raw materials included together with possible flavoring agents are blended in a known manner in a mixing vessel 1. The mixed raw materials are conducted via a pipeline 2 down into a grinding mill 3 where the raw materials are broken down to smaller particles by grinding so that a pumpable semifluid product mass is obtained. This product mass is pumpable with the help of the pump 4 through the pipeline 5 to a heat sterilizer, which preferably may be a so-called scraper sterilizer, that is to say a sterilizer where the product is heated to the desired temperature, in this case approx. 120° C., at the same time as the scrapers constantly maintain the treated material in motion so as to prevent on the one hand burning of the material on the hot surfaces and on the other hand to bring the material uniformly into contact with the hot surfaces so as to achieve a uniform temperature of the mass. After the passage through the scraper sterilizer 6 the product, now somewhat heat-coagulated, is passed to a new grinding mill 7, a so-called sterile mill which works under aseptic conditions and wherein the mass is finely distributed again to semifluid form, whereupon the product is introduced into a sterile tank 8.

From the sterile tank 8 the product mass is conducted through a filling pipe 9 into a tube 13 of packing material, to which product mass is fed continuously with the help of the filling pipe. It is assumed that the packing machine, here only shown schematically, is a so-called aseptic packing machine which works in such a manner that a plastic-coated laminate web 11 is wound off a magazine roll 10, passed over a deflection roller 12 and is formed to a tube 13 by joining together the longitudinal edges of the web to a seam. The packing material web 11 is sterilized separately, preferably with the help of a combination of a chemical treatment or a thermal treatment, e.g. dipping into a bath of hydrogen peroxide followed by a thermal treatment for the removal of the hydrogen peroxide present on the surface of the packing material. The tube formation takes place in a closed space or closed sterile chamber where an aseptic atmosphere is maintained by sterile-filtered air being constantly blown in. The contents introduced into the tube via the filling pipe 9, which are likewise sterile, are enclosed in their package by the tube being separated through repeated flattenings and sealings across the longitudinal direction of the tube. After sealing of the tube in the zones 14 the sealed parts of the tube may be formed to the desired shape and separated so as to form individual packing containers 15.

In the present invention it is assumed that the product mass is to be given a porous bubble structure, which may be done in such a manner that air is dissolved under pressure in the product mass or in some additive, whereupon the dissolved air is liberated again in the product mass when the pressure is equalised.

Figure 2:
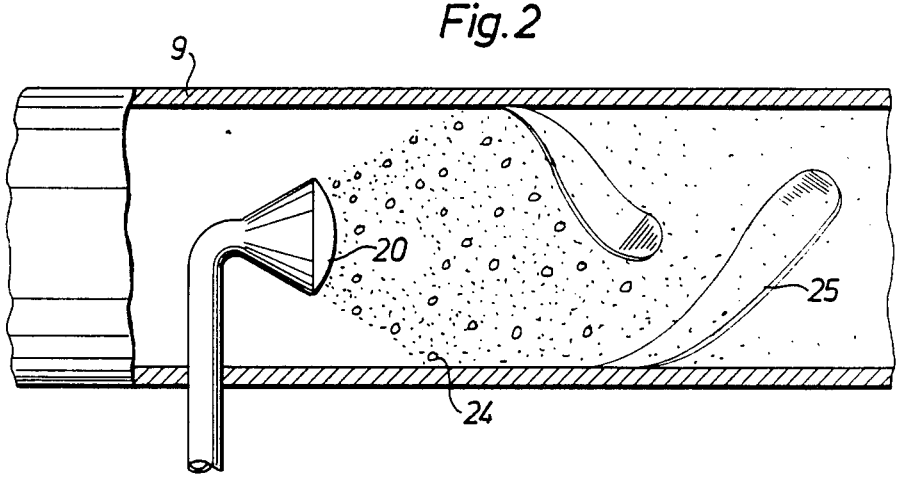

It is one of the main objects of the process that during preparation and packaging the product should be in a fluid or semi-fluid form which can be pumped and passed through pipelines, while after packaging the product should solidify and form a thermostable mass which, moreover, is sterile and packaged in such a manner that it is not infected. One method to achieve such a result consist in admixing sodium alginate with the mixture of raw materials, which is known from Swedish patent application No. 8201794-b 8. If sodium alginate is to form a gel, however, it has to react with calcium compounds, but for reasons which will be readily understood, the gel formation must not take place before the product mass has been introduced into its package, since otherwise the solidified product would stop up the pipelines, pumps etc. Calcium is added in the form of sparingly soluble calcium compounds which may be constituted, e.g., of ground fish bones or other calcium-containing bone products. The calcium which is required for forming a gel together with the sodium alginate is released appropriately with the help of an acid, and a suitable acid for this purpose is glucono-delta-lactone (GDL) which in aqueous solution forms an acid. GDL as such is classified as a carbohydrate and it is non-toxic and is used in foodstuff technology for grinding about a slow release of acid. GDL is used in aqueous solution and one possibility of obtaining a porous structure of the product mass is to mix water and GDL in a tank 16 by pumping a sterile-filtered mixture with the help of a pump 18 into the tank 16. Air which is sterile-filtered in a filter 17 is also conducted to the tank 16. The sterile-filtered air and the water are mixed in the tank 16 at normal room temperature, and at the pressure prevailing in the tank 16 a portion of the air will dissolve in the water which beomes saturated with air. The pressurised and sterile-filtered mixture of water and GDL is passed through the pipeline 19 into the filling pipe 9 where it is relieved from pressure via the nozzle 20. As the pressure is relieved the air dissolved in the water will be liberated in the form of small bubbles which are mixed homogeneously into the product mass with the help of a static blender which is shown in FIG. 2 comprising guide surfaces 25 in order to achieve a homogeneous blending. Since the product mass has a relatively high viscosity, the air bubbles formed will move only very slowly in the mass, as a result of which the homogeneous bubble structure is maintained in the packages formed until the product mass has stiffened and the position of the bubbles or voids 24 has become permanent. The sterile-filtered GDL-water solution which is saturated with air under pressure can also be added through the pipeline 27 before the mill 7. In this case the gas bubbles are already released before the aseptic mill 7 and the product mass has a bubble structure in the sterile tank 8. If the product mass possesses relatively low viscosity it is possible for the gas bubbles to rise towards the upper part of the sterile tank 8, thus causing the uniform bubble structure to disappear. In this case the pressure drop which causes the release of the gas bubbles must occur as late in the process as possible.

A second method consists in pressurizing the whole product mass by admixing sterile air with the product mass, this air being allowed to dissolve in the same. This admixture may take place in principle in the mixing tank 1, but preferably should be done in the sterile tank 8, since it is difficult to keep the dissolved air in solution during the heating which takes place in connection with the sterilization of the product mass. If this method is used air is fed to the sterile tank 8 via the pipeline 26. The air which is fed must of course be sterile-filtered, and since the product mass in the sterile tank 8 is pressurized, a part of the air will dissolve in the mass. The pressurised product mass is relieved of pressure in connection with the product being introduced into the filling pipe 9 via a throttle valve or in connection with the product being introduced into the packaging tube 13 which, as illustrated at FIG. 1, corresponds approximately to when the acid is added. As the pressure is relieved, the air dissolved in the product will be liberated and will form small bubbles which then rise and are distributed homogeneously in the whole product mass. In this case the bubbles also retain their homogeneous structure and distribution in the product mass if the latter possesses sufficiently high viscosity. The mutual position and size of the voids or bubbles becomes permanent when the product has solidified in its package 15.

If the viscosity of the product is not sufficiently high but the air bubbles or voids rise upwards in the package after packaging has taken place, the bubble structure will of course not remain homogeneous, but the lower part of the package will be more compact while the upper part will be porous. To prevent this, a temporary instant gel formation may be brought about and maintained until permanent gel formation of a reversible non-dimensionally stable gel, with the help of sodium alginate, has occurred. This temporary gel formation can be procured through cooling by approx. 5° C. after addition of agar or carrageenan which may be fed through a special piepline at, or in the vicinity of, the opening of the filling pipe 9. Thus, the agar and carrageen are added to the filling pipe 9 from the tank 21 via the pump 22 and the conduit 23.

It is the object of this temporary gel formation, as mentioned earlier, to "fix" the bubble structure which the product mass has attained as the pressure is relieved in the product or additive and maintain this "fixing" until the permanent gel formation has been completed, which may take some time because, e.g. of the slow liberation of the calcium.

It has been found that the method in accordance with the invention provides a homogeneous bubble structure in the product mass and that the acceptance of the product is considerably improved when it has been furnished with the resulting porous structure.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the present invention.

Accordingly, the foregoing detailed description should be considered exemplary in nature and not as limited to the scope and spirit of the invention as set forth in the appended claims.

What is claimed is:

1. A method for preparing a porous, solid or semi-solid food product containing ground fish or meat materials comprising:
   grinding said materials to form a mixture;
   adding sodium alginate and a calcium compound to said mixture;

heat treating said mixture;

introducing gas under pressure to said mixture while it is at least partially fluid, said gas being pumped through the pressurized mixture and being at least partially dissolved in the same mixture;

introducing an acid concurrently with or subsequent to introducing said gas under pressure, the acid liberating calcium ions from the calcium compound, said calcium ions in turn causing the sodium alginate to form a non-reversible thermostable gel which confers on the product a solid form with porous structure;

reducing the pressure on said materials approximately when adding said acid to liberate said gas and form gas bubbles in said mixture;

introducing the mixture into a package; and then allowing said mixture to solidify in said package.

2. A method in accordance with claim 1, wherein the gas used is air.

3. A method in accordance with claim 1, wherein said acid is provided by an aqueous solution of glucono-delta-lactone.

4. A method in accordance with claim 1, wherein after said gas bubbles have been introduced, the product is made to form an initial reversible, non-dimensionally stable gel so as to fix the gas bubbles in their distribution and location attained until the product is made to solidify permanently through a non-reversible, thermostable gel formed by sodium alginate.

5. A method in accordance with claim 4, wherein the formation of said initial gel is brought about through the addition to the product of at least one agent selected from the group consisting of carrageenan and agar.

6. A method in accordance with claim 5, wherein said product is cooled by at least about 5 Centigrade degrees after the addition of said agent.

7. A method in accordance with claim 1, wherein said acid added to said mixture is mixed homogeneously into said mixture with blending means.

8. A method in accordance with claim 1, wherein said acid and gas under pressure are pre-mixed together and then added to said mixture where the pressure is relieved via nozzle means entering conduit means for said mixture.

* * * * *